US 6,693,653 B1

(12) United States Patent
Pauly

(10) Patent No.: US 6,693,653 B1
(45) Date of Patent: Feb. 17, 2004

(54) METHOD OF ASSISTING CURSOR MOVEMENT TOWARD A NEARBY DISPLAYED TARGET

(75) Inventor: Martin Pauly, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 418 days.

(21) Appl. No.: 09/667,112

(22) Filed: Sep. 19, 2000

(51) Int. Cl.$^7$ ................................................ G09G 5/00
(52) U.S. Cl. ...................................... 345/857; 345/862
(58) Field of Search ................................ 345/857, 858, 345/862, 856

(56) References Cited

U.S. PATENT DOCUMENTS

| | | | | |
|---|---|---|---|---|
| 5,327,528 A | * | 7/1994 | Hidaka et al. | 345/858 |
| 5,565,888 A | * | 10/1996 | Selker | 345/823 |
| 5,808,601 A | * | 9/1998 | Leah et al. | 345/856 |
| 5,870,079 A | * | 2/1999 | Hennessy | 345/159 |
| 6,031,531 A | * | 2/2000 | Kimble | 345/862 |
| 6,057,826 A | * | 5/2000 | Gaultier et al. | 345/157 |
| 6,266,043 B1 | * | 7/2001 | Robin | 345/858 |
| 6,342,877 B1 | * | 1/2002 | Nikom | 345/157 |
| 6,567,070 B1 | * | 5/2003 | Light et al. | 345/157 |
| 6,587,131 B1 | * | 7/2003 | Nakai et al. | 345/857 |

* cited by examiner

Primary Examiner—John Cabeca
Assistant Examiner—Shawn M. Becker
(74) Attorney, Agent, or Firm—Nathan O. Jensen; Kyle Eppele

(57) ABSTRACT

A method of assisting movement of a cursor toward a target on a display screen is disclosed. According to the method, an initial cursor movement is detected. It is determined whether the direction of the initial cursor movement includes a component that is directed toward the target. A movement correction is defined as at least a portion of the component when the cursor is within a predetermined distance from the target. The initial cursor movement is combined with the movement correction to create a total cursor movement. The magnitude of the total cursor movement is adjusted to equal the magnitude of the initial cursor movement. If the cursor is within predetermined distances from multiple targets, a movement correction for each target is defined, and the movement corrections for all targets are combined with the initial cursor movement to create a total cursor movement. The magnitude of the total cursor movement is adjusted to equal the magnitude of the initial cursor movement.

11 Claims, 4 Drawing Sheets

METHOD OF ASSISTING CURSOR MOVEMENT TOWARD A NEARBY DISPLAYED TARGET

FIELD OF THE INVENTION

The present invention relates to computer displays, and more particularly, to displays using a cursor control device (CCD) to select viewable objects on the display.

BACKGROUND OF THE INVENTION

Avionics flight displays typically present a plurality of data and selection criteria to a pilot. For example, a display may include indicators for heading, altitude, attitude, airspeed, ambient temperature, traffic collision and avoidance, etc. Selectable menus provide an orderly means for presenting such information to a pilot. The pilots select menus and targets on each menu to operate the aircraft. The targets represent objects that must be routinely selected by the pilot to successfully fly an aircraft. Traditional flight displays require the pilot to press a button or switch to select between on-screen options.

Another selection method that has found widespread acceptance in other applications is that of using a cursor control device (CCD) such as a trackball or mouse. CCDs permit a pilot to direct an on-screen cursor to "point to" and select menus or targets on the display screen. CCD-based control systems that have been introduced in flight display systems have found general acceptance with pilots due to their intuitiveness and ease of use. However, there is still some question relating to the types of avionics operations and environments in which CCDs may be used. Typical avionics formats may have from two dozen to nearly one hundred selectable targets, with the exact number depending on the type of format to be displayed. The number of selectable targets on a visual display of a navigation map, for example, may vary greatly depending on the location of the aircraft. In turbulent or unstable conditions it may be difficult to predictably move a cursor with a CCD to select one of several targets, especially if the targets are displayed even somewhat close to each other. Because of these concerns, current avionics CCD use is limited to display screens having easily selectable targets.

It is therefore an object of the invention to make it easier for a user to use a CCD to select a target on a display.

It is another object of the invention to use a commonly known CCD design to select targets on a display.

It is a further object of the advantage to assist the selection of targets on a display, wherein the assistance is barely noticeable to a user.

A feature of the invention is a method of assisting or modifying cursor movement when the cursor is at least partially moving toward a selectable target on a display screen.

An advantage of the invention is that cursor movement increases the reliability of CCD use in a turbulent or otherwise unstable environment.

SUMMARY OF THE INVENTION

The invention provides a method of assisting cursor movement toward a selectable target on a display screen. According to the method, an initial cursor movement is detected. It is determined if the initial cursor movement is directed at least partially toward the target. The direction of the initial cursor movement is modified based at least on how much of the initial cursor movement is directed at least partially toward the target.

The invention also provides a method of assisting movement of a cursor toward a target on a display screen. According to the method, an initial cursor movement is detected. It is determined whether the direction of the initial cursor movement includes a component that is directed toward the target. A movement correction is defined as at least a portion of the component when the cursor is within a predetermined distance from the target. The initial cursor movement is combined with the movement correction to create a total cursor movement. The magnitude of the total cursor movement is adjusted to equal the magnitude of the initial cursor movement.

The invention further provides a method of assisting movement of a cursor on a display screen, wherein the display screen presents first and second targets thereon. According to the method, an initial cursor movement is detected. It is determined whether the direction of the initial cursor movement includes a first component that is directed toward the first target. A first movement correction is defined as at least a portion of the first component. It is determined whether the direction of the initial cursor movement includes a second component that is directed toward the second target. A second movement correction is defined as at least a portion of the second component. The initial cursor movement is combined with the first movement correction and the second movement correction to create a total cursor movement. The magnitude of the total cursor movement is adjusted to equal the magnitude of the initial cursor movement.

DETAILED DESCRIPTION OF THE DRAWINGS

Figure 1:
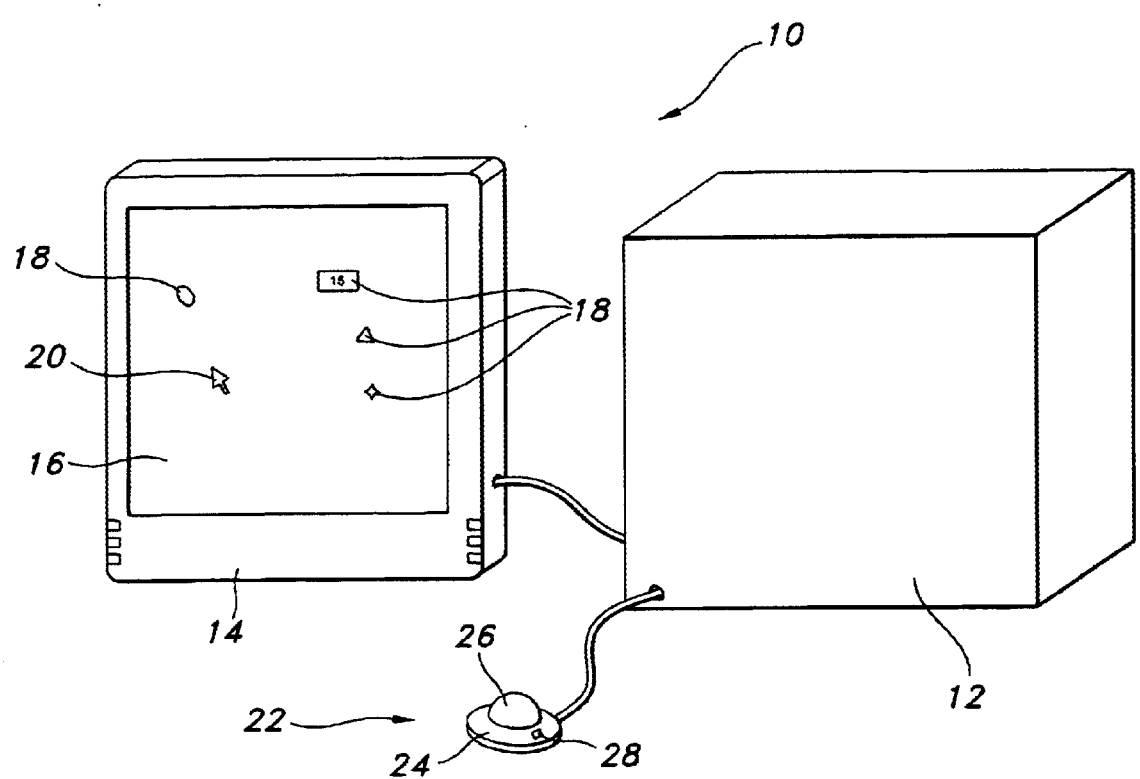
FIG. 1 is a schematic diagram of an avionics flight display according to the invention.

FIG. 1 schematically shows an avionics display system 10. Avionics display system 10 includes a computer 12, which typically includes components (not shown) such as a processor, memory, and input/output devices. A display unit 14 is connected to computer 12 and may even be integral with the computer. Display unit 14 has a display area 16 upon which a variety of display formats may be shown. Geometric or numeric objects or targets 18 are displayed upon display area. A cursor 20 is also displayed upon display area 16. In the present embodiment, cursor 20 is depicted as an arrow that is easily recognizable as it moves within the display area. Cursor 20 may also have other shapes as desired.

A cursor-controlled device (CCD), such as a trackball 22, is connected to computer 12. Trackball 22 includes a base 24, a spherical portion 26 that is movable with respect to the base, and a selector button 28. When a pilot or other user moves spherical portion 26, cursor 20 moves in a proportional direction and with a proportional velocity to the direction and velocity of the spherical portion. If the pilot actuates selector button 28 when cursor 20 is superimposed on one of targets 18, a predetermined function will be performed by computer 12 (for example, selection of a destination or waypoint on a navigation map, changing airspeed, acknowledging receipt of a message from a ground control station, changing the display to view other flight parameters, etc.). As previously explained, turbulent or other unstable conditions may make it difficult for a pilot to select a desired target, especially when a plurality of targets are displayed at a given time.

To help the pilot in the use of a CCD such as trackball 22, the invention provides a method of modifying cursor movement toward a nearby target. The steps of one embodiment of the method are shown in flowchart form in FIG. 2 and are illustrated graphically in FIGS. 3, 4, 5 and 6. FIG. 3 depicts a display area 16 upon which is displayed a target 18a. Target 18a has a shape identifying it as a waypoint on a navigation map. Surrounding target 18a is a focus area 30. Focus area 30 is shown as circular and having a radius $r_1$. When cursor 20 is within focus area 30, target 18a may be selected by actuating selector button 28. An attraction range 32 surrounds focus area 30. Attraction range 32 is shown as circular and having a radius $r_2$. It is not necessary for focus area 30 or attraction range 32 to be visible to the pilot.

Figure 2:
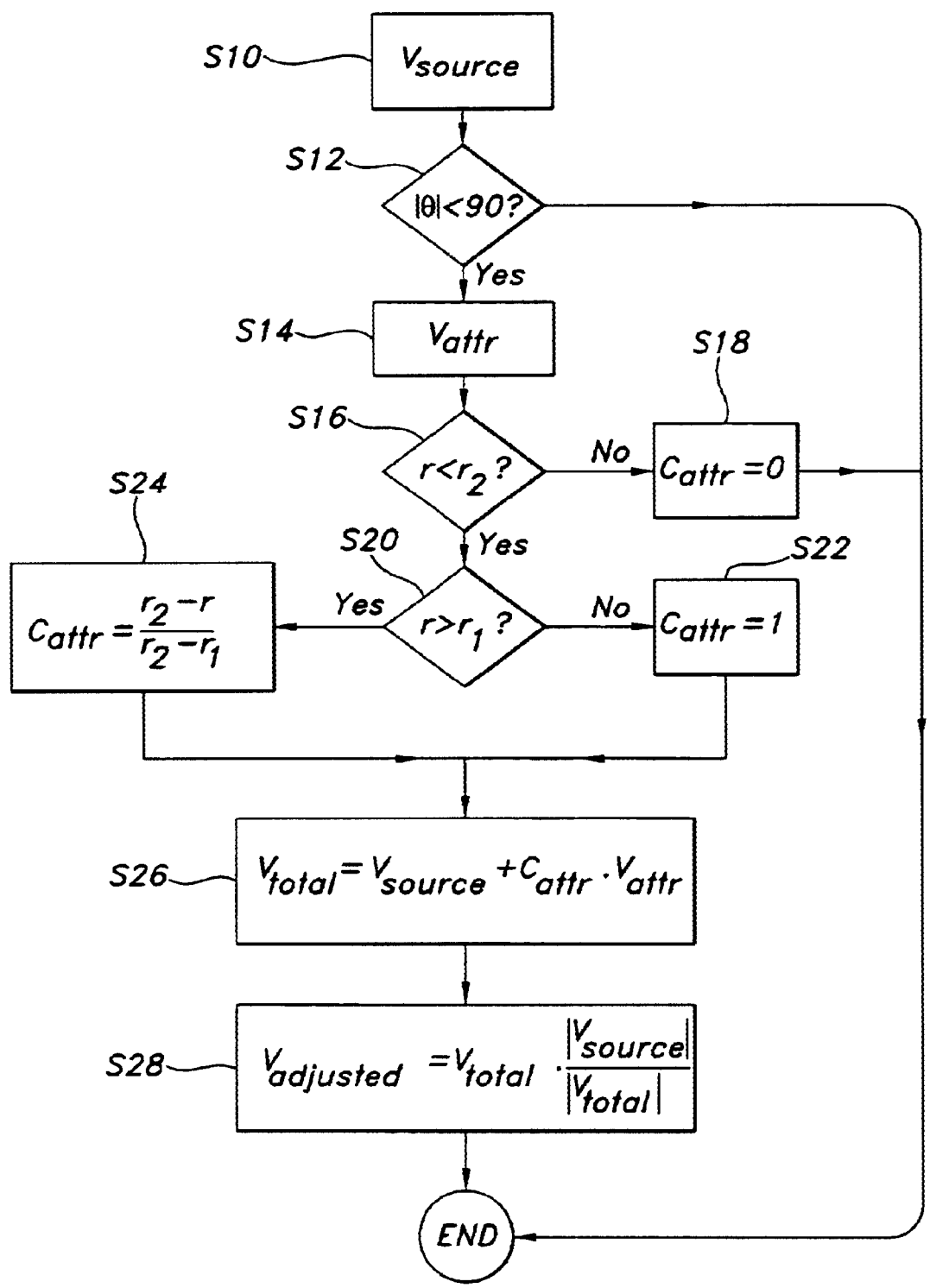
FIG. 2 is a flowchart of a method of assisting the movement of a cursor according to the invention.
Figure 3:
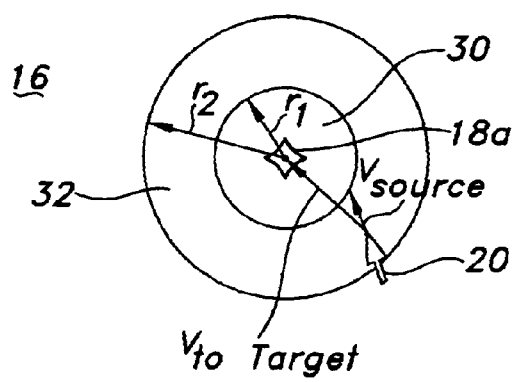
FIG. 3 is a view of a display output according to the method shown in FIG. 2.
Figure 4:
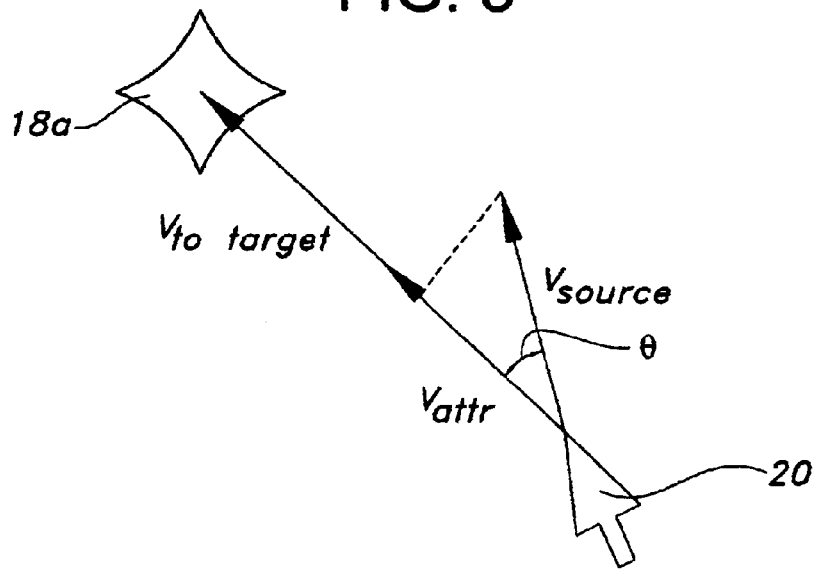
FIG. 4 is a view of the display output according the method shown in FIG. 2.

According to the method shown in FIG. 2, in step S10 it is determined if cursor 20 has moved. Movement of cursor 20 is modeled as a cursor movement vector $v_{source}$ (FIG. 3). A target vector $v_{target}$ is defined as traveling between cursor 20 and target 18a. Target vector $v_{target}$ has a length r. An angle θ is defined as the angle between $v_{source}$ and $v_{target}$. It is next determined whether cursor movement $v_{source}$ contains any component that is pointing toward target 18a. This may be accomplished as shown in step S12, where it is seen whether the absolute value of angle θ is less than 90 degrees. If the absolute value of angle θ is greater than 90 degrees, this means that $v_{source}$ has no component directed toward target 18a. No attractive movement toward target 18a is provided by the invention if cursor 20 is moving away from the target. In such a situation, further calculations according to the invention are terminated. However, if the absolute value of angle θ is less than 90 degrees, in step S14 an attraction vector $v_{attr}$ is defined as the component of cursor movement $v_{source}$ along target vector $v_{target}$. In other words, attraction vector $v_{attr}$ is the projection of cursor movement $v_{source}$ onto target vector $v_{target}$, as shown in FIG. 4.

Next, the position of cursor 20 relative to target 18a is determined, and a scalar coefficient of attraction $c_{attr}$ is calculated based on the distance r between the cursor and the target. Once coefficient of attraction $c_{attr}$ is determined, it will be multiplied with attraction vector $v_{attr}$. In step S16 it is determined if cursor 20 is within attraction range 32. If the cursor is not within the attraction range, in step S18 coefficient of attraction $c_{attr}$ is assigned a value of zero. This means that the invention will not assist cursor movement if the cursor is not within the attraction range. If the cursor is within the attraction range 32, in step S20 it is determined whether the cursor is within focus area 30. If so, in step S22 attraction coefficient $c_{attr}$ is assigned a value of 1. However, if the cursor is within the attraction range but outside of the focus area, the value of attraction coefficient $c_{attr}$ increases linearly between 0 and 1 according to the following formula:

$$c_{attr} = \frac{r_2 - r}{r_2 - r_1} \tag{1}$$

In step S26 a total velocity vector $v_{total}$ is computed by adding cursor movement vector $v_{source}$ and a portion of attraction vector $v_{attr}$ according to the following equation:

$$V_{total} = V_{source} + C_{attr} \cdot V_{attr} \tag{2}$$

Figure 5:
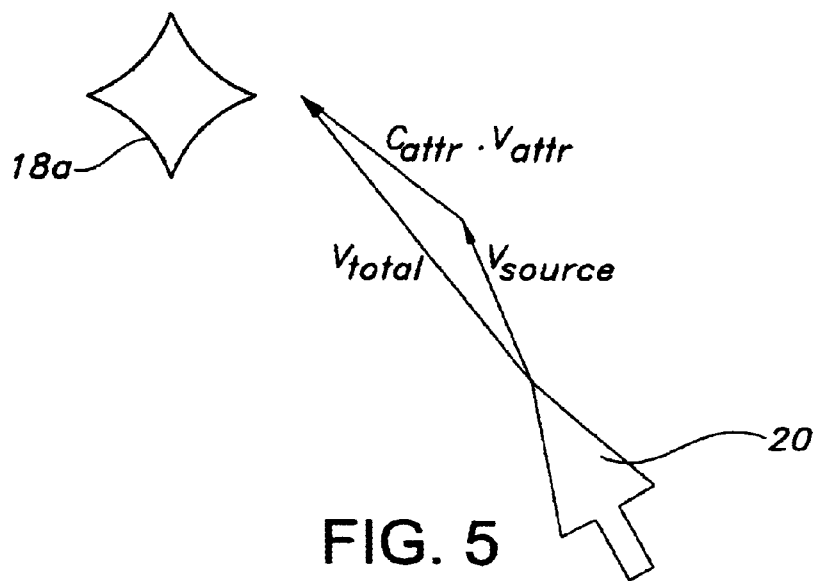
FIG. 5 is a view of the display output according to the method shown in FIG. 2.

This is shown graphically in FIG. 5. It can be seen that the invention will only adjust cursor movement $v_{source}$ if attraction coefficient $c_{attr}$ is positive and non-zero.

Figure 6:
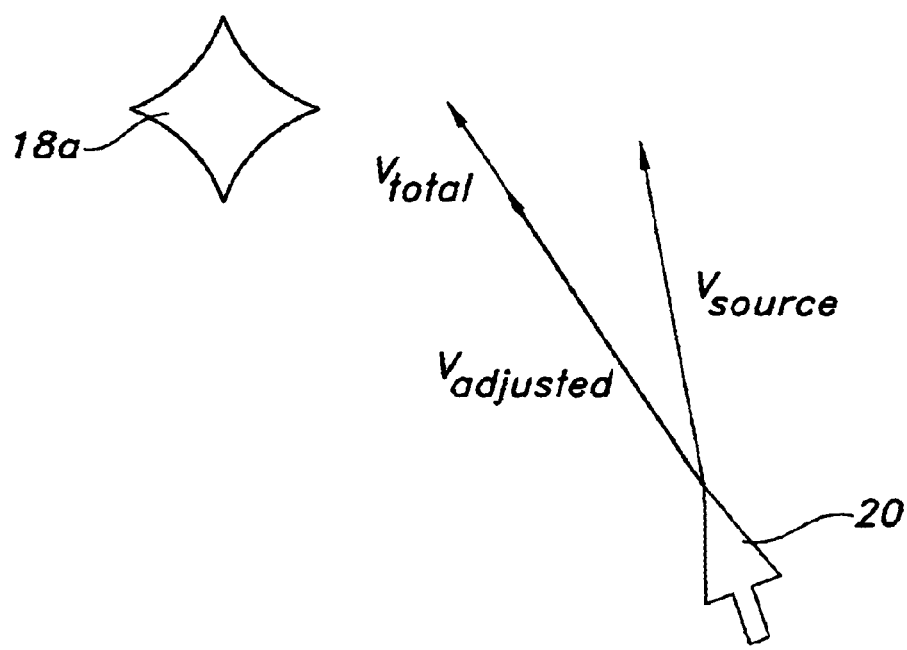
FIG. 6 is a view of a display output according to the method shown in FIG. 2.

In step S28 total velocity vector $v_{total}$ is adjusted to be the same length as cursor movement vector $v_{source}$. Such adjustment creates an adjusted velocity vector $v_{adjusted}$. As shown in FIG. 6, adjusted velocity vector $v_{adjusted}$ represents the actual movement (in direction and velocity) of cursor 20 in response to signals from trackball 22 that would otherwise direct cursor according to cursor movement vector $v_{source}$. Adjusted velocity vector $v_{adjusted}$ may be computed using the following equation:

$$v_{adjusted} = v_{total} \cdot \frac{|v_{source}|}{|v_{total}|} \tag{3}$$

According to the invention, then, the direction—but not velocity—of cursor movement toward a target is affected by the cursor's proximity to that target. Note that the invention does not move the cursor toward a target when the cursor is at rest, and does not increase the velocity of cursor movement. Furthermore, the invention does not impair movement of the cursor away from the target. Rather, the invention modifies the direction of cursor movement toward a nearby target based on the cursor's proximity to the target.

Figure 7:
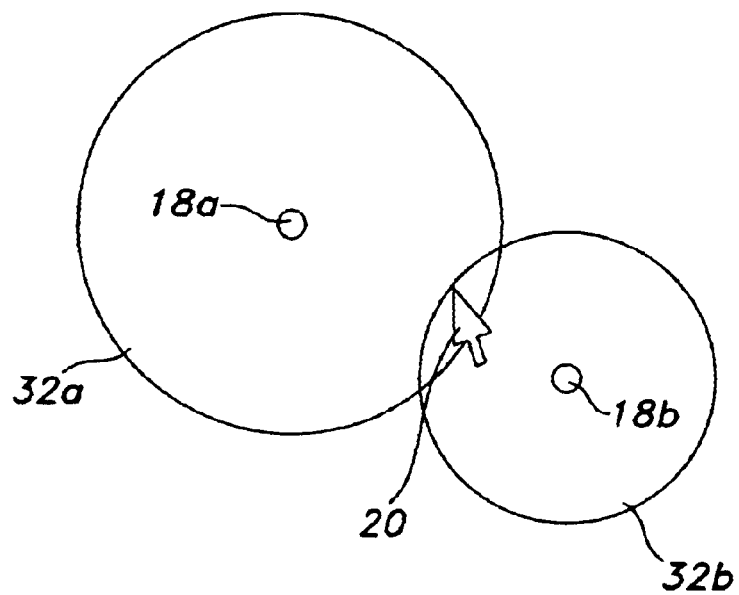
FIG. 7 is a view of a display output according to another embodiment of the invention.

It is possible that a plurality of targets are adjacent each other, and that a cursor may be within the attraction range of more than one of the targets at a given time. This is depicted in FIG. 7, in which cursor 20 is within attraction ranges 32a, 32b of nearby targets 18a and 18b. In such an instance the portions of all applicable attraction vectors are added to the original movement of the trackball. The following equation expresses how the vectors may be added:

$$v_{total} = v_{source} + \sum_{i=1}^{n} c_{attr_i} \cdot v_{attr_i} \tag{4}$$

where $c_{attr^i}$ and $v_{attr^i}$ denote the attraction coefficients and attraction vectors relating to each of the targets, and n denotes the number of targets.

As shown in FIG. 6, the direction correction of cursor movement vector $v_{source}$ appears to be slight. However, if the pilot truly intends to move cursor 20 toward target 18a, iterative use of the invented method will rapidly bring cursor 20 within focus area 30. Furthermore, the invention is designed to be barely noticeable to the user, yet provide some help to move cursor 20 to a target on the display.

The focus area and attraction range surrounding a target need not be circular, but may be designed to include non-circular target areas that are often found in avionics displays, such as text input fields or virtual pushbuttons. Furthermore, if a plurality of targets are positioned close together, it may be advantageous to design the focus areas and attraction ranges with different shapes and/or sizes. The embodiments of the invention have used vectors because of their ability to express magnitude and direction. However, the invention is sufficient in scope to accommodate methods not explicitly using vectors.

An advantage of the invention is that a cursor movement is subtly directed toward a nearby selectable target. This permits CCD's to be used in turbulent environments such as avionics.

Another advantage of the invention is that cursor movement is not assisted or modified to travel toward a nearby target if the cursor movement is travelling away from the target. This is so even if the cursor is within the attraction range.

Still another advantage is that the amount of assistance or modification to cursor movement is proportional to the distance between the cursor and the target. In other words, the closer the cursor is to the target, the more assistance is provided to cursor movement.

Still another advantage is that the invention will only assist cursor movement toward a target. The invention will not move a cursor toward a target if the cursor is not moving. This helps prevent "drifting" of the cursor toward an unintended target when the CCD has not moved, and therefore permits the user to accurately pinpoint a desired target.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of assisting cursor movement toward a selectable target on a display screen, comprising:
   detecting an initial cursor movement, including determining the magnitude of the initial cursor movement;
   determining if the initial cursor movement is directed at least partially toward the target;
   determining the distance between the target and the cursor;
   modifying the direction of the initial cursor movement based on
      the distance between the target and the cursor, and
      how much of the initial cursor movement is directed at least partially toward the target; and
   automatically ensuring that the magnitude of the modified cursor movement is the same as the magnitude of the initial cursor movement.

2. The method of claim 1, wherein the direction of the initial cursor movement is modified if the cursor is within a predetermined distance from the target.

3. The method of claim 2, wherein the predetermined distance defines an outer boundary of an attraction range, and wherein the amount that the direction of the initial cursor movement is modified varies within the attraction range.

4. The method of claim 3, wherein the amount that the direction of the initial cursor movement is modified is linearly proportional to the closeness of the cursor to the target within the attraction range.

5. A method of assisting movement of a cursor toward a target on a display screen, comprising:
   detecting an initial cursor movement, wherein the initial cursor movement has a magnitude and a direction;
   determining whether the direction of the initial cursor movement includes a component that is directed toward the target;
   defining a movement correction as at least a portion of the component when the cursor is within a predetermined distance from the target;
   combining the initial cursor movement with the movement correction to create a total cursor movement, wherein the total cursor movement has a magnitude; and
   automatically adjusting the magnitude of the total cursor movement to equal the magnitude of the initial cursor movement.

6. The method of claim 5, wherein the movement correction has a magnitude, and further including:
   determining the distance from the cursor to the target;
   wherein the magnitude of the movement correction is dependent on the distance from the cursor to the target.

7. The method of claim 5, wherein the predetermined distance is an outer boundary of an attraction range, and further including:
   defining a coefficient of attraction, wherein the coefficient of attraction gradually increases between the outer boundary of the attraction range and the target, and further wherein the magnitude of the movement correction is proportional to the coefficient of attraction.

8. The method of claim 7, wherein the attraction range has an inner boundary, and further including:
   linearly varying the coefficient of attraction from the outer boundary of the attraction range to the inner boundary of the attraction range.

9. A method of assisting movement of a cursor on a display screen, the display screen presenting first and second targets thereon, the method comprising:
   detecting an initial cursor movement, wherein the initial cursor movement has a magnitude and a direction;
   determining whether the direction of the initial cursor movement includes a first component that is directed toward the first target;
   defining a first movement correction as at least a portion of the first component;
   determining whether the direction of the initial cursor movement includes a second component that is directed toward the second target;
   defining a second movement correction as at least a portion of the second component;
   combining the initial cursor movement with the first movement correction and the second movement correction to create a total cursor movement, wherein the total cursor movement has a magnitude; and automatically adjusting the magnitude of the total cursor movement to equal the magnitude of the initial cursor movement.

10. The method of claim 9, wherein the first movement correction has a magnitude, and further including:

determining the distance from the cursor to the first target;

wherein the magnitude of the first movement correction is dependent on the distance from the cursor to the first target.

11. The method of claim 9, wherein the second movement correction has a magnitude, and further including:

determining the distance from the cursor to the second target;

wherein the magnitude of the second movement correction is dependent on the distance from the cursor to the second target.

* * * * *